April 24, 1962 H. E. HABER ET AL 3,031,648

MAGNETIC DATA STORAGE DEVICE

Filed May 25, 1960

INVENTORS
HAROLD E. HABER &
RICHARD M. CLINEHENS
BY Louis A. Kline
J. Cavender
THEIR ATTORNEYS

United States Patent Office 3,031,648
Patented Apr. 24, 1962

3,031,648
MAGNETIC DATA STORAGE DEVICE

Harold E. Haber and Richard M. Clinehens, Dayton, Ohio, assignors to The National Cash Register Company, Dayton, Ohio, a corporation of Maryland Filed May 25, 1960, Ser. No. 31,573
5 Claims. (Cl. 340—174)

The present invention relates generally to data storage devices. More specifically, the invention relates to new and improved magnetic data storage devices which are readily adaptable for use as memory elements in present-day electronic computers and data processors.

Magnetic data storage devices at present employed in most coincident current computer memories are normally in the form of magnetic cores of toroidal configuration having a relatively high magnetic remanence and a substantially rectangular hysteresis characteristic. However, even though toroidal cores are admirably well suited as storage devices, they are, nevertheless, extremely fragile and quite difficult to fabricate, require an expenditure of a considerable amount of time and effort in order to be operatively connected in circuit, and are normally quite sensitive to variation in operating temperature.

In an attempt to alleviate some of these problems, there has been developed a magnetic data storage device commonly known as a "twistor," such as that shown and described in the November 1957, issue of "The Bell System Technical Journal" by A. H. Bobeck, volume XXXVI, pages 1319 to 1340. Such a device normally comprises a length of nonmagnetic and electrically conductive wire, which constitutes a common core, and a coaxial layer of saturable ferromagnetic material extruded on the outermost surface of the core. The core and the ferromagnetic coating are both simultaneously stretched and twisted, and the ends thereof thereafter maintained in a fixed position during operation of the device. As a direct result of the applied stretching and twisting actions, an easy direction of magnetization is established in the coating which is coaxially oriented in substantially a helical direction throughout the entire core length, similar to the threads of a screw. Such a ferromagnetic device has been found to possess a substantially high positive and negative magnetic remanence and a substantially rectangular hysteresis characteristic. Consequently, selected length portions of the coating, in the direction of twist, are allowed to attain one or the other of two stable conditions, respectively characterized by a positive or negative magnetic remanence. Thus, a magnetic field of $\pm H$ oersteds, along the direction of twist, causes selected length portions to magnetically switch from one magnetic state to another, whereas a field of $\pm H/2$ oersteds produces only negligible changes in the magnetic remanence of the coating.

During operation of the device, a plurality of similar coils are separately wound thereabout and are positioned in a spaced side-by-side relationship with respect to one another, to encompass and thereby define a corresponding plurality of helical-path length portions of ferromagnetic material. Storage of binary information in a selected length portion of the coating is accomplished by sending a current impulse of "half-select" magnitude into the conductive wire of the common core, and simultaneously sending a current impulse of "half-select" magnitude into the selected coil, in such directions that the vector summation of the magnetic fields produced by both of the coincident half-select currents is at least equal in magnitude to $\pm H$ oersteds and is oriented in the same direction as the easy direction of magnetization of the coating.

During "reading" of a selected length portion of the coating, either the core or the corresponding coil is pulsed with a current impulse of "full-select" magnitude to individually develop a magnetic field of at least $\pm H$ oersteds in the opposite direction from the magnetic field developed during storage of the function. In response to the "read" impulse, an electrical signal is or is not available between the ends of the core, or the corresponding coil, depending upon which one was pulsed, according to whether a binary "1" or a binary "0" had previously been established in that particular length portion of the coating encompassed by that particular coil, as represented by its positive or negative magnetic remanence.

Since the advent of the "twistor" type of magnetic data storage devices, there have been developed various types of storage devices which characteristically possess a helically-oriented easy direction of magnetization and a substantially rectangular hysteresis characteristic, without the necessity of physically maintaining the storage device in a constant state of torsional strain. For example, as disclosed in co-pending United States patent application Serial No. 696,987, of John R. Anderson and Richard M. Clinehens, filed November 18, 1957, and assigned to the present assignee, one of such particular types of storage devices is fabricated by first twisting an elongated substrate of electrically conductive material relative to a longitudinal axis thereof. Thereafter, a saturable ferromagnetic coating is electrodeposited on the outermost surface thereof, after which time the ends of the substrate are released and the coated substrate is allowed to approach its original state as before being twisted. As a result of the release, a torsional strain is stored in the ferromagnetic coating which is related to, but opposite in direction from, the stress which was mechanically applied to the substrate prior to deposition of the magnetic coating thereon. Consequently, an easy direction of magnetization is established in the coating which is oriented in a helical direction with respect to the longitudinal axis of the substrate.

In co-pending United States patent application Serial No. 791,695, of Ignatius Tsu, filed February 6, 1959, and also assigned to the present assignee, there is disclosed a novel magnetic data storage device which is fabricated by first forming a plurality of substantially regularly-spaced grooves on the surface of a non-magnetic substrate, and thereafter providing the surface of the substrate with a saturable ferromagnetic coating which substantially conforms to the substrate surface in such a manner that the easy direction of magnetization of the ferromagnetic coating is oriented in substantially the same direction as the grooves, whereas, in co-pending United States patent application Serial No. 827,412, now Patent No. 2,945,217, of Robert D. Fisher et al., filed November 7, 1958, and also assigned to the present assignee, there is disclosed therein a novel magnetic data storage device which possesses a helically oriented easy direction of magnetization and a substantially rectangular hysteresis characteristic without any application of a mechanically generated torsional strain either before, during, or after fabrication thereof. Such a device comprises an elongated and electrically conductive substrate having a saturable ferromagnetic electrodeposit disposed on the surface thereof which is substantially free from any mechanically imparted torsional strain and yet possesses a crystal orientation and a skewed easy direction of magnetization with respect to the longitudinal axis of the substrate.

It has been discovered, however, that substantially all of the just-described storage devices are relatively strain-sensitive after fabrication, which in some instances is not desirable. As a result, when the device is subsequently bent, twisted, or otherwise physically distorted to the extent that the mechanically imparted strain exceeds the elastic limit of the substrate material, there is an accompanying alteration or modification of the characteristics of the magnetic coating, which in some applications is undesirable.

In co-pending United States patent application Serial No. 795,934, of Donal A. Meier, filed February 27, 1959, which is a continuation-in-part of co-pending United States patent application Serial No. 728,739, of Donal A. Meier, filed April 15, 1958, now abandoned, the undesirable strain sensitivity of the device is alleviated somewhat by plating an unoriented saturable ferromagnetic coating onto a slender glass filament which constitutes the supporting base structure for the magnetic material. Such devices utilizing glass filaments as a supporting base are, however, relatively expensive to manufacture because of the high cost of uniform glass filaments and also due to the relatively complicated procedure required to produce acceptable storage devices having uniform magnetic characteristics throughout the length thereof.

Therefore, a primary objective of the present invention is to devise a new and improved magnetic data storage device having greatly improved characteristics over those heretofore possible, and yet being capable of being economically fabricated by mass production techniques and being readily adaptable for incorporation in present-day electronic computers and data processors.

A more specific object of the present invention is to devise such a new and improved magnetic data storage device which possesses a substantially rectangular hysteresis characteristic, and yet is much more insensitive to mechanically imparted strain and, accordingly, possesses greater magnetic stability than before.

In accordance with the present invention, there has been provided a new and improved magnetic data storage device which comprises essentially a stiff resilient wire-like substrate of an alloy of either copper-beryllium or Phosphor-bronze, having an average transverse dimension in the order of 5 to 50 mils and of substantially uniform structural cross-section throughout a major portion of its length. Electrodeposited onto the substrate throughout a major portion of its length is a saturable ferromagnetic coating having a substantially uniform thickness in the order of 500 to 10,000 angstroms.

The features of the present invention which are believed to be novel are set out further with particularity in the appended claims. The organization and manner of operation of the invention, together with other objects and advantages thereof, may best be understood by reference to the following description taken in connection with the accompanying drawing, in the several figures of which like reference numerals identify like elements, and in which:

Figures 1, 2, 3, 4:
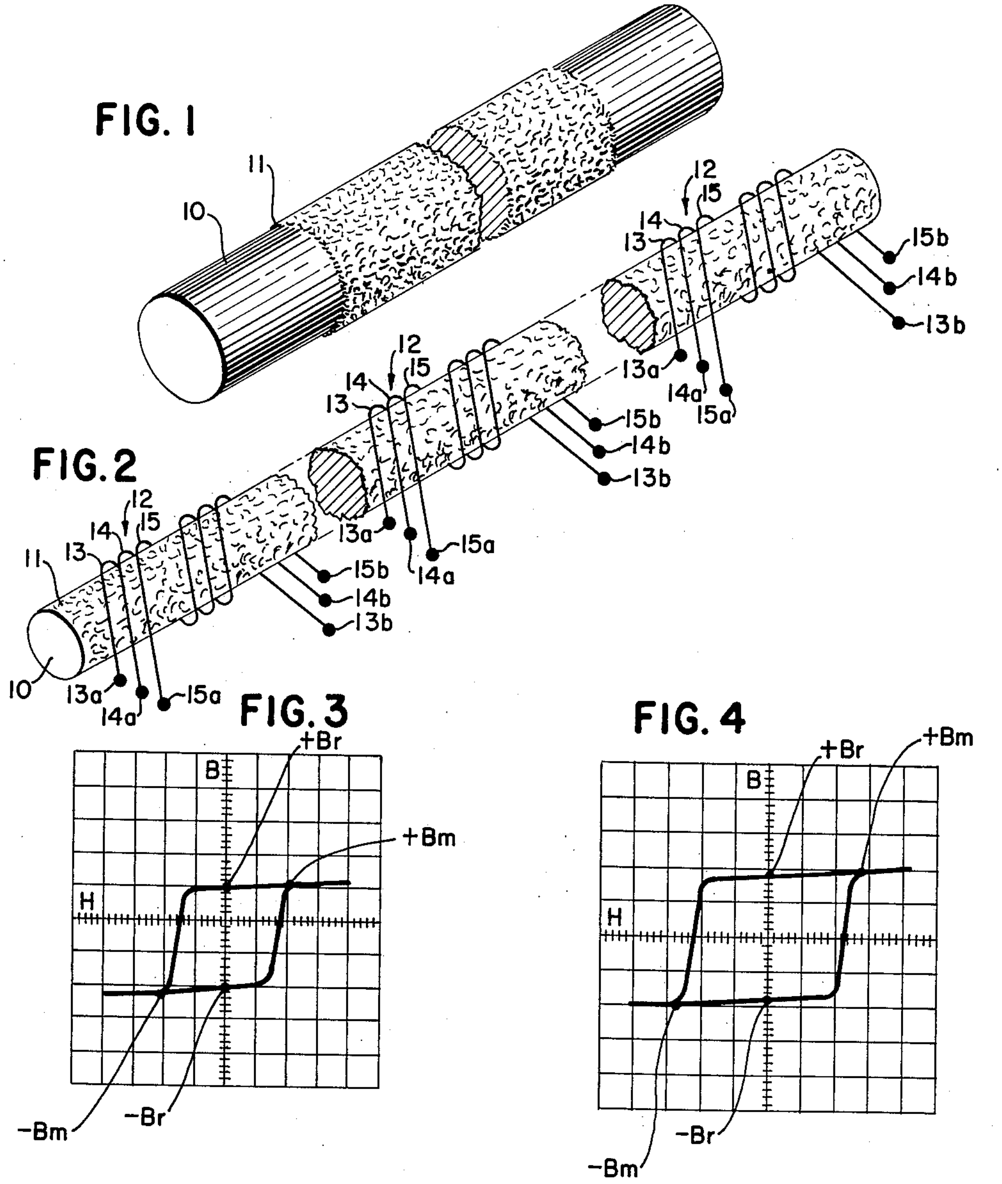
FIG. 1 is a greatly magnified perspective view, partly cut away, illustrating the salient features of the storage device constructed in accordance with the teachings of the present invention.
FIG. 2 is a greatly enlarged view illustrating a mode of operation of such a storage device.
FIG. 3 is an exact reproduction of an oscillograph display illustrating the actual hysteresis-loop characteristics of such a storage device having a substrate material of Phosphor-bronze alloy.
FIG. 4 is an exact reproduction of an oscillographic display illustrating the actual hystersis-loop characteristics of such a storage device having a substrate material of copper-beryllium alloy.

With reference to FIG. 1, there is illustrated a greatly enlarged perspective view of a novel magnetic data storage device constructed in accordance with the present invention. Such a device comprises a stiff, resilient, and spring-like filament 10 of Phosphor-bronze or copper-beryllium alloy, which constitutes the core or supporting substrate portion of the device. Adherent to the outermost surface of the substrate is a thin film-like coating 11 of saturable ferromagnetic material. The ferromagnetic coating is preferably electrodeposited onto the substrate in accordance with the procedure and means hereinafter described, is preferably composed of a large portion of iron and a small portion of nickel, and possesses a substantially rectangular hysteresis characteristic.

Even though the preferred proportions of iron to nickel are of the order of 97 parts iron to 3 parts nickel, by weight, usable devices are produceable with the percentage of iron in the range of from 94 to 99 and the percentage of nickel in the range of from 6 to 1, all by weight. In fact, the relative percentages of iron and nickel may be varied in the same manner as disclosed in co-pending United States patent applications Serial No. 773,843, of Jerome S. Sallo et al., filed November 14, 1958, and Serial No. 803,585, of Ignatius Tsu et al., filed April 2, 1959, both of which are assigned to the present assignee. If desired, other saturable ferromagnetic alloys may be utilized with equal success, as illustrated in co-pending United States patent application Serial No. 764,522, of Ignatius Tsu et al., filed October 1, 1958, and also assigned to the present assignee.

The metallic substrate onto which the magnetic deposit is to be formed is desirably of circular cross-section, with the average diameter being in the order of 5 to 50 mils, preferably 12 mils. A preferred magnetic coating is an alloy of approximately 97 parts iron and 3 parts nickel, by weight, having a thickness in the order of 3,000 angstroms, as computed by indirect methods, and possesses a substantially rectangular hysteresis characteristic, as illustrated in FIGS. 3 and 4. In FIG. 3 there is shown an exact reproduction of an oscillographic display illustrating the actual hysteresis-loop characteristics of the present storage device having a substrate material of Phosphor-bronze alloy; in FIG. 4 there is shown an exact reproduction of an oscillographic display illustrating the actual hysteresis-loop characteristics when a copper-beryllium alloy is utilized as the material for the substrate. While the substrate may be as small as 5 mils or as large as 50 mils in diameter, and the magnetic coating as thick as 10,000 angstroms or as thin as 500 angstroms for certain special applications, the above given preferred dimensions have been found to provide devices having sufficient strength and rigidity to permit handling without the necessity of exercising unusual care, and also possessing excellent magnetic characteristics suitable for use in storage arrays and matrices.

When utilized in an information-store apparatus, a suitably long length of the storage device shown in FIG. 1 is used in conjunction with a plurality of spaced-apart coil units, illustrated generally as 12 in FIG. 2. Each coil unit comprises a plurality of plural-turn solenoid-coils arranged in generally concentric relationship and encircling a respective small length portion of magnetic coating 11. As shown, an exemplary coil unit comprises three coils 13 through 15, each coil comprising ten turns of a suitably insulated conductor, with each conductor respectively terminating in a pair of terminals **13*a*—13*b*, 14*a*—14*b*, and 15*a*—15*b***. Even though the coils are illustrated in FIG. 2 as bifilar, it is of course obvious that the unit may comprise three superimposed coils of any of the well-known configurations. The coil units are preferably spaced along the lengths of the device sufficiently far apart to obviate undesirable mutual magnetic interactions. This spacing may be effectively established by winding the coil units directly onto the device. Preferably, however, the coil units are disposed in an array or matrix, in coaxial relationship along suitable bores established in an embedment (not shown).

In the latter arrangement, the coil units are relatively fixed in position with respect to each other by the embedding compound with the bores of the coils extending through the embedding material of suitable internal diameter for easy insertion of the magnetic device through the bores of the coil units in each row or column. As many coil units as may be desired are arranged and disposed in spaced-apart relationship along the storage device, in either of the described modes; and, for example, the number of coil units arranged for cooperation with respective portions of a storage device may possibly be forty or more. Each coil unit thus cooperates with its own respective length portion of the storage device. Exemplary ten-turn coils are preferably of the order of one sixteenth of an inch in length. The general nature of the bi-stable magnetic film, the coils of the units, and the interactions therebetween are like or similar to those described and explained in co-pending United States patent application of Donal A. Meier, Serial No. 728,739, filed April 15, 1958, and assigned to the present assignee, to which reference may be had for further details in respect to these matters.

A preferred electrolytic plating bath and procedure for producing the improved device will next be disclosed and explained. Prior to being subjected to electroplating action in the electrolytic bath, the copper-beryllium or Phosphor-bronze wire-like substrate is subjected to a thorough cleaning in a suitable alkaline cleaning bath. As an example, a solution of the commercially available product named "Shipleys Alkaline Cleaner" is found to give excellent results. Immediately following the alkaline bath treatment, the substrate is thoroughly rinsed with distilled water and then immersed in a 50% HCl solution for a period sufficient to remove a thin oxide layer from the surface of the substrate. The acid "pickle" treatment is immediately followed by a thorough rinsing with distilled water, after which the substrate is immediately subjected to the electroplating action.

The preferred electrolyte consists essentially of a solution made up from 315 grams of $FeCl_2 \cdot 4H_2O$, 10 grams of $NiCl_2 \cdot 6H_2O$, and 180 grams of $CaCl_2$, per liter of solution, with addition of dilute HCl, if necessary, to bring the pH to a value of $0.95 \pm 0.05$. Enough iron powder or iron wool, to insure that the solution is ferrous rather than ferric, may be added to the electrolytic bath if desired. An acceptable procedure for effecting the electroplating operation is to progressively pass or draw the substrate through a one-and-one-half-inch zone of contact with the electrolyte at a speed of approximately ten feet per hour, using a plating current density of from 20 to 250 amperes/square foot, preferably 22 a.s.f., and at a temperature of approximately 75 degrees centigrade. Care should be exercised to apply the plating current uniformly over the exposed length and periphery of the substrate, and this may be effectively accomplished by employing a tubular or spiral anode electrode through and along the axis of which the substrate is traversed or drawn. The substrate is connected to a suitable current source as the cathode of the system, and the exposure time thereof may be varied somewhat, depending upon the thickness of plating desired and the size of the substrate. Analysis of the plating deposited on the substrate indicates a content of approximately 94–99% iron and 1–6% nickel, by weight. As shown in FIGS. 3 and 4, the ratio of remanent flux density ($B_r$) to saturation flux density ($B_m$) is, in each instance, substantially equal to 0.89 with a coercivity of approximately 15 oersteds. It is noted that, if more rapid "switching" of the produced magnetic devices is desired, the switching time may be lowered by using a somewhat lower concentration of $NiCl_2 \cdot 6H_2O$ in the electrolyte; for example, 8 to 10 grams per liter of solution. Using concentrations of the order of that just noted, switching times faster than 25 millimicroseconds are attainable.

Immediately following the electroplating operation, the plated substrate is thoroughly rinsed with distilled water, dried by means of an acetone bath or spray, and thereafter given a protective coating to avoid oxidation or other degradation of the iron-nickel magnetic deposit. The protective coating is preferably applied by dipping the dried device in a suitable moisture-proof self-curing resin; satisfactory protection has been secured by using the commercially available product labeled "Laminar 48 Fuse-on Urethane" marketed by Magna Corporation, Los Angeles, California, United States of America. As soon as the resin or other protective coating has cured or dried, the magnetic device is ready for association with coil units in the manner previously described.

In addition to the highly desirable magnetic characteristics previously described and the greatly improved insensitivity to physical strain during handling after fabrication, the devices of the present invention also possess many added advantages and improvements. For example: the cost of Phosphor-bronze and copper beryllium substrate materials are far less than the cost of comparable glass filaments; substrates are obtainable in closer dimensional tolerance limits, i.e., $\pm 1/4$ mil, contra $\pm 1$ mil, thus allowing better control of plating conditions; advantage may be taken of the grain orientation of the substrate, which is normally longitudinally disposed, to induce a like orientation in the magnetic coating through epitaxial growth; the uniformity of magnetic properties of the finished product is greatly improved as compared to the use of silvered glass filament type substrates; and the expensive and time-consuming silvering process is eliminated.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A magnetic data storage device comprising: a stiff resilient wire-like substrate of an alloy taken from the group consisting of Phosphor-bronze and copper-beryllium, said substrate having an average transverse dimension in the order of 5 to 50 mils and of substantially uniform structural cross-section throughout a major portion of its length; and a saturable ferromagnetic coating deposited onto said substrate throughout a major portion of the length thereof and having a substantially uniform thickness in the order of 500 to 10,000 angstroms.

2. A device in accordance with claim 1, wherein the substrate alloy in Phosphor-bronze.

3. A device in accordance with claim 1, wherein the substrate alloy is copper beryllium.

4. A device in accordance with claim 1 in which said device is encompassed by a plurality of similar electrically-energizable coils spaced side by side with respect to each other.

5. A device in accordance with claim 1, wherein the saturable magnetic coating consists essentially of a large major proportion of iron and a small minor proportion of nickel.

References Cited in the file of this patent

UNITED STATES PATENTS

| | | |
|---|---|---|
| 2,619,454 | Zapponi | Nov. 25, 1952 |
| 2,730,491 | Moline et al. | Jan. 10, 1956 |
| 2,945,217 | Fisher | July 12, 1960 |

OTHER REFERENCES

Journal of Applied Physics, vol. 30, No. 4, April 1959, "Millimicrosecond Magnetic Switching and Storage Element," by Donal A. Meier, pages 45S, 46S.